W. J. WILDER.
PLOW COLTER.
APPLICATION FILED JULY 7, 1909.
938,097.
Patented Oct. 26, 1909.
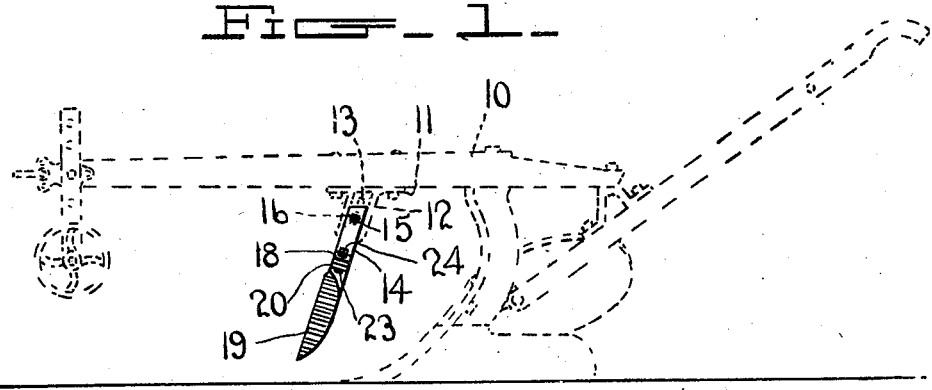
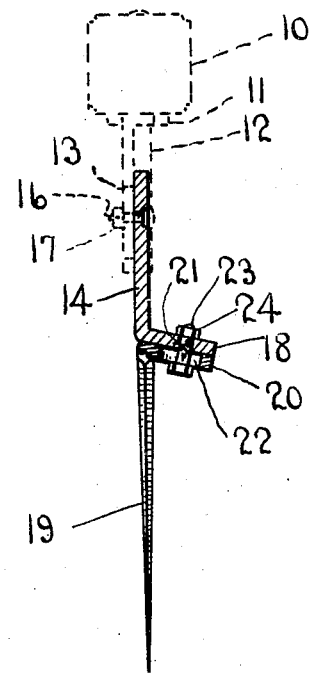
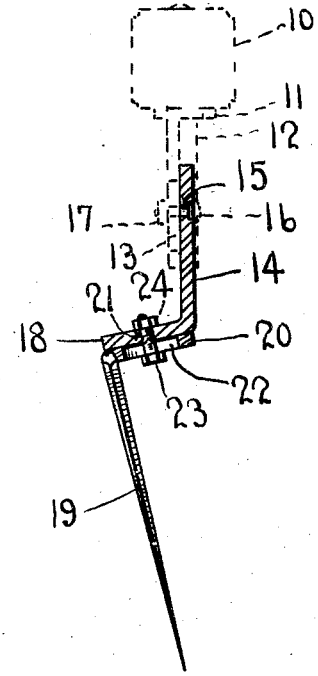
Witnesses
L. B. James
L. N. Gillis
Inventor
Walter J. Wilder
By Chandler & Chandler
Attorneys

UNITED STATES PATENT OFFICE.

WALTER J. WILDER, OF GOWANDA, NEW YORK.

PLOW-COLTER.

938,097. Specification of Letters Patent. Patented Oct. 26, 1909.

Application filed July 7, 1909. Serial No. 506,349.

*To all whom it may concern:*

Be it known that I, WALTER J. WILDER, a citizen of the United States, residing at Gowanda, in the county of Cattaraugus, State of New York, have invented certain new and useful Improvements in Plow-Colters; and I do hereby declare the following to be a full, clear, and exact description of the invention, such as will enable others skilled in the art to which it appertains to make and use the same.

This invention relates to agricultural implements and has special reference to a plow colter of the kind used to cut the landside of the furrow.

One object of the invention is to provide an improved form of plow colter which may be readily attached to any of the existing types of plows and which will be adapted to cut a landside of any desired width with relation to the furrow.

Another object of the invention is to provide a simple construction of colter which may be adjusted to cut a perpendicular or inclined landside.

With the above and other objects in view the invention consists in general of an improved form of plow colter provided with means for changing the position and inclination of the cutting blade.

The invention further consists in certain novel details of construction and combinations of parts hereinafter fully described, illustrated in the accompanying drawings, and specifically set forth in the claims.

In the accompanying drawings, like characters of reference indicate like parts in the several views, and Figure 1 is a side elevation of a plow showing the improved colter applied thereto, the plow being shown in dotted lines. Fig. 2 is a sectional view of the colter on the line 2—2 of Fig. 1, the view showing the colter as arranged for cutting a perpendicular landside. Fig. 3 is a view similar to Fig. 2 showing the colter as arranged for cutting an inclined landside.

In the present showing there is indicated a form of plow having a straight beam 10 whereon is mounted a bracket 11 having spaced ribs 12 and being provided with a longitudinal slot 13.

In the form of colter here shown there is provided a body or standard 14 adapted to fit between the ribs 12 and through this standard 14 extends an aperture 15 for the reception of a bolt 16 which passes through the aperture 15 and through the slot 13, being provided with a suitable nut 17 so that the standard 14 is capable of being adjusted to varying positions within the ribs 12 longitudinally of the bracket 11. The lower end of the standard 14 is provided with an angled portion 18 and this angled portion extends outwardly and downwardly as clearly shown in Figs. 2 and 3. The under side of this member 18 thus is inclined to the horizontal.

At 19 is shown a colter blade of ordinary form and this colter blade is provided with a projection 20 the upper surface of which is inclined in such direction that when the parts are in the position shown in Fig. 2 the blade 19 will lie vertical and in alinement with the standard 14.

When it is desired to vary the position of the colter 19 with reference to the standard 14 in Fig. 2, provision is made for this by having a bolt aperture 21 in the end 18 and a slot 22 in the projection 20. Through this aperture and slot passes a bolt 23 provided with the usual nut 24. By this means the colter blade 19 may be moved in or out from the position of alinement with the standard 14.

When it is desired to cut the landside at an angle to the perpendicular the parts are positioned as indicated in Fig. 3 wherein the standard 14 is shown reversed so that the end 18 projects toward the share side of the plow while the colter projection 20 extends toward the landside of the plow. By reason of the slanting surfaces on the under side of the member 18 and the upper side of the portion 20 the colter blade 19 is caused to assume the position shown in Fig. 3 and this causes the landside of the furrow to be cut so that this side of the furrow slants toward the share side of the plow. By reason of this arrangement the furrow turns completely over so that the turned earth lies smooth and no space is left unfilled to permit the land drying out.

The device thus provided is simple in construction and easy of operation.

Having thus described the invention, what is claimed as new, is:—

1. In a device of the kind described, a colter, a standard, said colter and standard having their ends abutting and said ends being inclined, and means to secure the standard and colter together.

2. In a device of the kind described, a standard having a lower end extending outward from the body, said lower end having an inclined bottom face and having a bolt aperture therethrough, a colter having an upper end extending outward from the body and butting against the lower end of the standard, said upper end having an inclined upper face and having a bolt aperture therethrough, one of said bolt apertures being elongated to form a slot, and a securing bolt passing through said apertures to hold the colter in adjusted position on the standard.

3. In a device of the kind described, a standard having a lower end extending outward from the body, said lower end having an inclined bottom face and having a bolt aperture therethrough, a colter having an upper end extending outward from the body and butting against the lower end of the standard, said upper end having an inclined upper face and having a bolt aperture therethrough, said faces being inclined equally in opposite directions so that the colter may be brought into alinement with the standard, one of said bolt apertures being elongated to form a slot, and a securing bolt passing through said apertures to hold the colter in adjusted position on the standard.

In testimony whereof, I affix my signature, in presence of two witnesses.

WALTER J. WILDER.

Witnesses:
  MICHAEL KENNEDY,
  FRANK PUTNEY.